United States Patent [19]

Hauser et al.

[11] 4,102,644
[45] Jul. 25, 1978

[54] TINT COMPOSITIONS FOR NYLON HAVING IMPROVED FUGITIVITY PROPERTIES

[75] Inventors: Peter Jacob Hauser, Inman, S.C.; James Easton Hendrix, La Grange, Ga.; Hans Heinrich Kuhn, Spartanburg, S.C.

[73] Assignee: Milliken Research Corporation, Spartanburg, S.C.

[21] Appl. No.: 720,213

[22] Filed: Sep. 3, 1976

[51] Int. Cl.$^2$ .......................... D06P 3/00; D06P 5/08
[52] U.S. Cl. ........................... 8/164; 8/18 R; 8/DIG. 21
[58] Field of Search ................... 8/164, 18, DIG. 21

[56] References Cited

U.S. PATENT DOCUMENTS

| | | | |
|---|---|---|---|
| 2,222,798 | 11/1940 | Ellis | 8/164 |
| 2,828,180 | 3/1958 | Sertorio | 8/DIG. 21 |
| 3,157,633 | 11/1964 | Kuhn | 8/50 |
| 3,157,663 | 11/1964 | Laszlo | 260/294.9 |
| 3,582,255 | 6/1971 | Kissling | 8/164 |
| 3,891,387 | 6/1975 | Latta et al. | 8/164 |
| 3,929,406 | 12/1975 | Farmer et al. | 8/164 |

FOREIGN PATENT DOCUMENTS

| | | | |
|---|---|---|---|
| 950,361 | 2/1964 | United Kingdom | 8/164 |
| 1,054,746 | 1/1967 | United Kingdom | 8/DIG. 21 |

OTHER PUBLICATIONS

Lynn, "Prep. of Fibers," Textile Chemicals & Auxiliaries, 2nd Ed., 1957, Reinhold Publish. Corp., N.Y., pp. 30-33.

*Primary Examiner*—Herbert J. Lilling
*Attorney, Agent, or Firm*—Glen M. Burdick; H. William Petry

[57] ABSTRACT

Tint compositions for nylon having improved fugitivity properties comprising an admixture of a colorant having the general formula

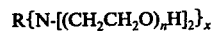

wherein R is an organic dyestuff radical, $x$ is an integer of 1 to 6, and the product of $2n$ times $x$ is from about 200 to about 300, and at least 30 weight percent of a water-soluble polymeric resin. A minor effective amount of a free radical inhibitor can be incorporated into the tint compositions to retard free radical interaction between the colorant and the nylon.

9 Claims, No Drawings

TINT COMPOSITIONS FOR NYLON HAVING IMPROVED FUGITIVITY PROPERTIES

This invention relates to tint compositions. In one aspect it relates to tint compositions for nylon having improved fugitivity properties.

Colorants, such as fugitive tints, are often used to color code textiles during production and/or finishing operations to identify certain synthetic or natural fibers. For example, the fibers may be tinted during the spinning of the fibers into yarns and the utilization of the yarns in knitting or weaving operations to ensure that undesirable fibers or yarns are not present. Such tints are then removed during one of the last finishing operations prior to sale. To be acceptable, a fugitive tint should be capable of being easily removed, even after exposure to extreme conditions which might be encountered during the production and finishing of the textile. Also, the tint should have good color stability to minimize fading during exposure to heat and/or light, conditions which may be encountered during processing of the tinted fibers into the final product.

Fugitive tints are generally classified as water fugitive or solvent fugitive. For example, dyestuffs containing one or more polyethyleneoxy groups are generally considered water fugitive tints, whereas dyestuffs containing one or more polypropyleneoxy groups are considered solvent fugitive. Thus, the particular choice of tints chosen depend largely upon the finishing operations of the fiber and the fugitivity properties of the tint.

Fugitive tints which have achieve wide acceptance in the textile industry are the polyethylene oxide tints described in U.S. Pat. No. 3,157,633. Such tints are a combination of a dyestuff radical and one or more polyethyleneoxy groups. Dyestuff radicals disclosed in the patent include nitroso, nitro, azo, diphenylmethane, triarylmethane, xanthene, acridene, methine, thiazole, indamine, azine, oxazine, or anthraquinone radicals. Preferably, such radicals are attached to the polymeric constituents of the tint compositions by an amino nitrogen.

While the above tints have exhibited the desired fugitivity properties on most fibers, both synthetic and natural, problems have been encountered when employing such tints on nylon, especially amorphus, undrawn nylon and fully drawn cationic dyeable nylon. The major problem encountered has been that the tints of the prior art, when used on the beforedescribed nylon fibers, are not easily removed, under severe processing conditions and, in many instances, have resulted in a permanent discoloration of the nylon fibers.

It is, therefore, an object of the invention to provide a fugitive tint composition for nylon.

Another object of the invention is to provide a fugitive tint composition for amorphus, undrawn nylon and fully drawn cationic dyeable nylon.

These and other objects of the invention will be apparent to those skilled in the art from a reading of the following detailed description.

According to the present invention, we have discovered improved tint compositions for nylon, especially amorphous, undrawn nylon and fully drawn cationic dyeable nylon. Broadly, the improved tint compositions of the invention comprise a major effective amount of a colorant to provide the desired color properties to the tint composition and at least 30 weight percent of a water soluble polymeric resin. More specifically, the improved tint compositions of the invention comprise an admixture containing a major amount of a colorant having the general formula $$R\{N-[(CH_2CH_2O)_nH]_2\}_x$$

wherein R is an organic dyestuff radical, $x$ is an integer of 1 to 6, and the product of $2n$ times $x$ is from about 200 to about 300, and at least 30 weight percent of a water-soluble polymeric resin having a molecular weight of from about 4,000 to about 10,000.

The colorants useful in the production of the fugitive tint compositions for amorphus, undrawn nylon and fully drawn cationic dyeable nylon of the present invention and having the above-described formula are further described in U.S. Pat. No. 3,157,633 to Kuhn, herein incorporated by reference.

The amount of colorant employed in the tint compositions of the invention can vary widely, but will generally be the major constituent of the concentrated tint composition. The amount of the colorant will largely be dependent upon the particular shade of tint desired, the color of the colorant, and the amount of the water-soluble polymeric resin employed. Especially desirable results have been obtained wherein the tint compositions of the invention contain from about 60 to about 70 weight percent of the colorant.

The water-soluble polymeric resins employed in the tint compositions of the present invention can be any water-soluble polymeric resin having a molecular weight of from about 4,000 to about 10,000. The amount of such water-soluble polymeric resins employed in the tint compositions for nylon having improved fugitivity properties can vary widely provided the resin is present in an amount of at least 30 weight percent based on the amount of the colorant. Especially desirable results can be obtained when the water-soluble polymeric resin is present in the tint composition in an amount of from about 30 to about 40 weight percent.

Examples of water-soluble polymeric resins which can be employed in the tint compositions of the present invention are polyalkylene oxides and copolymers of polyalkylene oxides wherein the alkylene moiety of such resins contain from 2 to about 4 carbon atoms, such as polyethylene oxide, polypropylene oxide, polybutylene oxide and copolymers of ethylene oxide - propylene oxide, ethylene oxide - butylene oxide. Other suitable water-soluble polymeric resins are derivatives of such polyalkylene oxides produced by the polyalkoxylation of compounds containing an active hydrogen, such as alcohols, amines, acids and acid amides. Such derivatives are well known in the art. Typical of such derivatives resulting from the polyalkoxylation of compounds containing an active hydrogen are polyalkoxylated lauryl alcohol, polyalkoxylated glycerol, polyalkoxylated sorbitol, polyalkoxylated ethylenediamine, polyalkoxylated aniline, polyalkoxylated stearic acid, polyalkoxylated stearmide, and the like.

Especially desirable results have been obtained wherein the water-soluble polymeric resins are polyethylene glycols or the reaction products of ethylene oxide with compounds containing an active hydrogen as previously described.

When desired, an effective minor amount of a free radical inhibitor can be incorporated into the tint composition to further retard interaction and chemical bonding of the colorant to the nylon fibers. While the amount of free radical inhibitor can vary widely, such is generally employed in an amount of from about 0.5 to 5 weight percent, based on the total weight of the tint composition.

The term free-radical inhibitor as used herein is to be understood to mean any compound which is more reactive to free radicals than the colorant and thus preventing free radical reactions, such as free radical polymerization, between the nylon and the colorant. Thus, any suitable free-radical inhibitor meeting the above definition can be employed. Especially desirable results have been obtained when the free-radical inhibitor is thiourea, hydroquinone, or derivatives thereof.

In order to more fully describe the present invention, the following examples are set forth. However, it is to be understood that such examples are for illustrative purposes only and should not be considered as limiting the spirit or scope of the invention.

EXAMPLE I

An aqueous tint containing mixture was formed by admixing 5 weight percent of a colorant having the structural formula

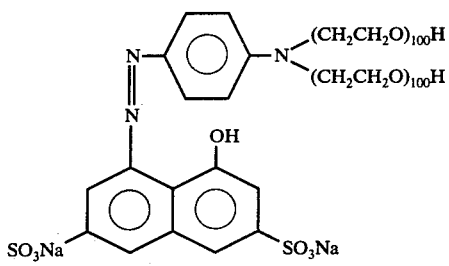

with 95 weight percent of an aqueous spin finish composition, a processing aid used by fiber manufacturers in the production of fibers. Generally the aqueous spin finish compositions contain lubricants, anti-static agents, emulsifying agents and the like.

The aqueous tint containing mixture was then applied to undrawn nylon-6 by soaking the nylon in the mixture for a period of time to insure that the nylon was thoroughly wetted with the mixture. The wetted nylon was cold drawn to a ratio of 3:1. The cold drawn nylon was heated to a temperature of 180° F for 5 minutes and thereafter placed in an autoclave.

The cold drawn tinted nylon in the autoclave was heated, under pressure, to a temperature of 280° F for 3 minutes. The autoclave was then vented for 2 minutes to relieve the pressure on same. Thereafter, a vacuum was pulled on the autoclave for 3 minutes. The autoclave cycle of heating, venting and pulling a vacuum was repeated 4 times.

The tinted, heat set nylon was removed from the autoclave and washed for 1 minute with cold water. The washed nylon was dried in air, examined, and found to contain severe staining.

EXAMPLE II

A tint containing mixture was formed by admixing 13 weight percent of a tint, e.g., 8 weight percent of a polyethylene glycol having an average molecular weight of 6,000 and 5 weight percent of the colorant, with 87 weight percent of the aqueous spin finish composition of Example I. The tint containing mixture was then applied to undrawin nylon-6 and the wetted nylon was treated according to the procedure set forth in Example I. After rinsing and drying, the nylon was found to be free of stains.

EXAMPLE III

A tint containing mixture was formed by admixing 6 weight percent of a tint composition, e.g., 2 weight percent of a polyethylene glycol having an average molecular weight of 6,000 and 4 weight percent of the colorant, with 94 weight percent of the aqueous spin finish composition of Example I. The tint containing mixture was applied to undrawn nylon-6 and the wetted nylon was treated according to the procedures of Example I. The rinsed and dried nylon was free of colorant stains.

EXAMPLE IV

A tint containing mixture was formed by admixing 6 weight percent of a tint composition, e.g., 2 weight percent of a 200 molar ethylene oxide ethoxylated aniline and 4 weight percent of the colorant, with 94 weight percent of the aqueous spin finish composition of Example I. The tint containing mixture was applied to undrawn nylon and the wetted nylon was heated and treated within the autoclave as set forth in Example I.

After removing the nylon from the autoclave the nylon was passed through a mock dye bath solution. The mock dye bath solution was a conventional aqueous dye solution containing all of the additives or ingredients used in conventional dyeing solutions except for the dye constituent. Further, the nylon was subjected to the various heating and cooling steps employed in the conventional dyeing procedures, such being well known in the art.

The nylon was then removed from the mock dye bath, rinsed for 1 minute with cold water and air dried. The washed nylon was found to be free of stains.

EXAMPLE V

A tint containing mixture was formed by admixing 3.08 weight percent of a tint composition, e.g., 1 weight percent of a polyethylene glycol having an average molecular weight of 6,000, 0.08 weight percent thioruea and 2 weight percent of the colorant, with 96.92 weight percent of the spin finish composition of Example I. The tint containing mixture was applied to cationic dyeable nylon-6 and the wetted nylon was heated and processed in an autoclave according to the procedures of Example I. Upon examining the rinsed and dried nylon only very faint staining was detected and that substantially all of the tint had been removed from the cationic dyeable nylon-6 by rinsing with cold water.

Having thus described the invention, we claim:

1. Fugitive tint compositions for amorphus, undrawn nylon or fully drawn cationic dyeable nylon comprising an admixture of a colorant having the formula

wherein R is an organic dyestuff radical, $x$ is an integer of 1 to 6, and the product of $2n$ times $x$ is from about 200 to 300, and at least 30 weight percent of a water-soluble polymeric resin having a molecular weight of from about 4,000 to about 10,000.

2. The fugitive tint compositions of claim 1 wherein said colorant is present in an amount of from about 60 to about 70 weight percent and said water-soluble polymeric resins is present in the amount of from about 30 to 40 weight percent.

3. The fugitive tint compositions of claim 2 wherein said water-soluble polymeric resin is selected from the group consisting of polyalkylene oxides, copolymers of polyalkylene oxides wherein the alkylene moiety of said resin contains from 2 to about 4 carbon atoms and derivatives of said polyalkylene oxides produced by the polyalkoxylation of compounds containing an active hydrogen.

4. The fugitive tint compositions of claim 3 wherein said compounds containing an active hydrogen are selected from the group consisting of alcohols, amines, acids and acid amides.

5. The fugitive tint compositions of claim 4 wherein said water-soluble polymeric resins are selected from the group consisting of polyethylene glycols and the derivatives are the reaction products of ethylene oxides with said compounds containing an active hydrogen.

6. The fugitive tint compositions of claim 5 wherein said derivatives are selected from the group consisting of polyethoxylated lauryl alcohol, polyethoxylated glycerol, polyethoxylated sorbitol, polyethoxylated ethylenediamine, polyethoxylated aniline, polyethoxylated stearic acid and polyethoxylated stearamide.

7. The fugitive tint composition of claim 2 which includes a minor effective amount of a free-radical inhibitor.

8. The fugitive tint composition of claim 7 wherein said free-radical inhibitor is present in an amount of from about 0.5 to about 5 weight percent, based on the total weight of said tint composition.

9. The fugitive tint composition of claim 8 wherein said free-radical inhibitor is selected from the group consisting of thiourea, hydroquinone and derivatives of same.

* * * * *